United States Patent
Yano et al.

(10) Patent No.: US 7,236,346 B2
(45) Date of Patent: Jun. 26, 2007

(54) SEMICONDUCTOR APPARATUS AND METHOD OF CHARGING DESIRED NUMBER OF CAPACITORS

(75) Inventors: Koichi Yano, Tokyo (JP); Akihiko Fujiwara, Kanagawa-ken (JP)

(73) Assignee: Ricoh Company, Ltd. (JP)

( * ) Notice: Subject to any disclaimer, the term of this patent is extended or adjusted under 35 U.S.C. 154(b) by 35 days.

(21) Appl. No.: 10/983,088

(22) Filed: Nov. 8, 2004

(65) Prior Publication Data

US 2005/0185361 A1    Aug. 25, 2005

(30) Foreign Application Priority Data

Nov. 7, 2003    (JP)    ............................. 2003-378339

(51) Int. Cl.
  *H01G 4/228*    (2006.01)
(52) U.S. Cl. .............................. 361/306.3; 361/306.1; 361/306.2; 324/428; 324/433; 356/145; 356/149
(58) Field of Classification Search ............ 361/306.1, 361/306.2, 306.3; 324/428, 433; 365/145, 365/149
See application file for complete search history.

(56) References Cited

U.S. PATENT DOCUMENTS

| | | | | |
|---|---|---|---|---|
| 5,960,898 A * | 10/1999 | Okada et al. | ............... | 180/65.8 |
| 5,977,748 A * | 11/1999 | Okamura | ................... | 320/118 |
| 6,075,378 A * | 6/2000 | Okamura | ................... | 324/771 |
| 6,275,011 B1 * | 8/2001 | Yang | ........................... | 320/150 |
| 6,295,002 B1 * | 9/2001 | Fukuda | ..................... | 340/636.1 |
| 6,316,917 B1 * | 11/2001 | Ohta | ........................... | 320/166 |
| 6,323,623 B1 * | 11/2001 | Someya et al. | ............. | 320/166 |
| 6,384,674 B2 * | 5/2002 | Tanizaki et al. | ............. | 327/544 |
| 6,437,575 B1 * | 8/2002 | Lin et al. | ..................... | 324/433 |
| 6,483,165 B2 * | 11/2002 | Ooishi et al. | ............... | 257/499 |
| 6,545,525 B2 * | 4/2003 | Itoh et al. | ................... | 327/524 |
| 6,853,177 B2 * | 2/2005 | Shibayama et al. | ....... | 324/76.48 |
| 7,098,639 B2 * | 8/2006 | Natsume et al. | ............ | 323/282 |

FOREIGN PATENT DOCUMENTS

JP    3313647    5/2002

\* cited by examiner

*Primary Examiner*—Nguyen T. Ha
(74) *Attorney, Agent, or Firm*—Dickstein Shapiro LLP

(57) ABSTRACT

A capacitor charging semiconductor apparatus including a plurality of serially connected capacitors to be charged. A direct current source is applied to the plurality of capacitors. A plurality of bypass transistors is provided to bypass charge current supplied to the plurality of capacitors when a voltage of a capacitor exceeds a prescribed reference level. A plurality of parallel monitor circuits is provided to control the plurality of bypass transistors to equally charge the plurality of capacitors. A plurality of capacitor connection terminals is connected to both ends and intersections of the plurality of capacitors. A plurality of transistor connection terminals is connected to the plurality of control terminals of the bypass transistor. A prescribed number of capacitors is optionally charged by increasingly shorting a number of capacitor connection terminals from the highest and lower voltage side capacitor connection terminals.

7 Claims, 7 Drawing Sheets

SEMICONDUCTOR APPARATUS AND METHOD OF CHARGING DESIRED NUMBER OF CAPACITORS

CROSS-REFERRENCE TO RELATED APPLICATION

This application claims priority under 35 USC §119 to Japanese Patent Application No. 2003-378339 filed on Nov. 7, 2003, the entire contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to capacitor charging semiconductor apparatuses, in particular, to capacitor charging semiconductor apparatuses each integrally formed from a plurality of parallel monitor circuits to equally charge a plurality of electric double layer type capacitors, which are serially connected to each other.

2. Discussion of the Background Art

An electric double layer type capacitor can be charged faster than a secondary battery because the secondary battery generally takes a certain time period to be charged. Since a rated voltage of the electric double layer type capacitor is generally low, for example, approximately three volts, a necessary voltage is typically obtained by serially connecting a plurality of such capacitors. When charging such capacitors, a problem that arises is unevenness of charge caused by a difference in a capacitor capacitance, its own charging and discharging, and so on. One approach is to employ an equally charging circuit called a parallel monitor circuit as illustrated in FIG. 6. Specifically, since an output of a comparator CMP1 becomes high, and accordingly a transistor Tr1 is turned on when a voltage V1 of a capacitor C1 exceeds a reference voltage Vr1 in the parallel monitor circuit, charge current is bypassed by the transistor Tr1 to avoid excessive charging to the capacitor C1 as discussed in Japanese Patent Application Laid Open No. 2000-50495, for example.

However, due to non-integration of a semiconductor apparatus, i.e., assembly of discrete parts, size and cost of the background parallel monitor circuit increase. Then, the integration is conventionally demanded. However, if a semiconductor apparatus is manufactured while changing a number of parallel monitor circuits to be integrated, a small number of various products are generally produced because the number of serially connected capacitors varies depending upon usage. As a result, advantages of mass-production of the semiconductor apparatus are suppressed. Thus, the semiconductor apparatus is expensive and cannot practically be used. Further, if a semiconductor apparatus is manufactured with it being integrated with only one parallel monitor circuit, the parallel monitor circuit cannot be effectively downsized resulting in loss of the advantages of the integration.

Then, as shown in FIG. 1, when approximately five to ten parallel monitor circuits (e.g. five in FIG. 1) are integrated on one semiconductor apparatus IC1, and a number of capacitors to be charged is more than that of the integrated parallel monitor circuits, the same semiconductor apparatuses can be longitudinally connected as needed. Thus, a semiconductor apparatus can be mass-produced, while downsizing and reducing cost of the entire monitor circuit.

However, a total number of chargeable capacitors are unavoidably integral multiples of that of capacitors charged by one semiconductor apparatus. As a result, the other number of capacitors cannot be charged.

SUMMARY OF THE INVENTION

Accordingly, an object of the present invention is to address and resolve the above-noted and other problems and provide a new a capacitor charging semiconductor apparatus and method. The above and other object are achieved according to the present invention by providing a novel capacitor charging semiconductor apparatus which includes a plurality of capacitors serially connected to each other, a direct current power source that supplies charge current to the plurality of capacitors, and a plurality of bypass use transistors each bypasses charge current when a voltage of a capacitor exceeds a prescribed reference level. A plurality of parallel monitor circuits is provided to control the bypass use transistor to equally charge the plurality of capacitors. A plurality of capacitor connection terminals is included in the semiconductor apparatus and is connected to both ends and a plurality of intersections formed between the plurality of capacitors. A plurality of transistor connection terminals is included in the semiconductor apparatus to be connected to control terminals of bypass use transistors. A prescribed number of the capacitors are optionally charged by shorting prescribed number of capacitor connection terminals starting from those connected to a highest voltage side and a lower voltage side.

In another embodiment, a prescribed number of capacitors are charged by shorting neighboring capacitor connection terminals in a capacitor charging semiconductor apparatus.

In yet another embodiment, a capacitor charging semiconductor apparatus has a plurality of control terminals to control charge current and a semiconductor apparatus. A number of chargeable capacitors are increased by longitudinally connecting a plurality of capacitor charging semiconductor apparatuses to each other via some of the control terminals.

In yet another embodiment, the parallel monitor circuit includes a signal generation function that generates a charge completion signal when a capacitor voltage reaches a prescribed reference voltage. The charge completion signal is controlled not to be outputted from a parallel monitor circuit where a corresponding capacitor connection terminal is shorted.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
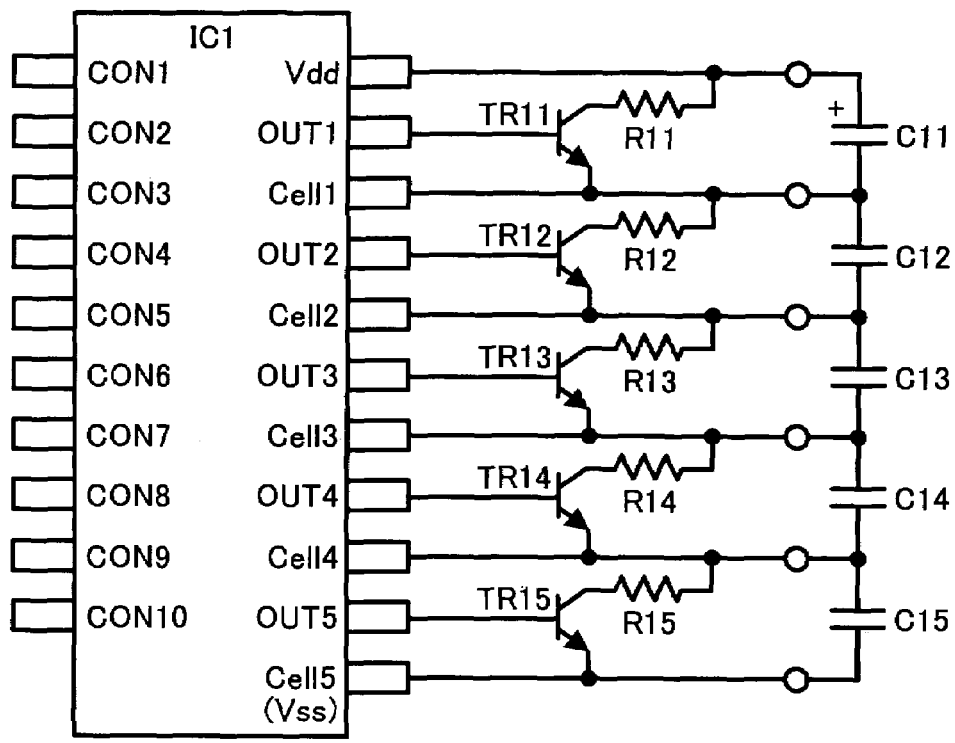
FIG. 1 illustrates an exemplary fundamental capacitor charging semiconductor apparatus according to a first embodiment of the present invention.

Referring now to the drawings, wherein like reference numerals and marks designate identical or corresponding parts throughout several figures, particularly to FIG. 1, a fundamental configuration of a capacitor charging semiconductor apparatus is described. As shown, a number of parallel monitor circuits provided in a semiconductor apparatus are the same as that of the capacitors. Specifically, the semiconductor apparatus IC1 includes five groups of parallel monitor circuits to charge five capacitors C11 to C15, a plurality of capacitor connection terminals Vdd, Cell1 to Cell5 (i.e., Vss) connected to both ends and intersections between respective five serially connected capacitors C11 to C15, and a plurality of transistor connection terminals OUT1 to OUT5 connected to respective bases of bypass use transistors. When the five capacitors are to be charged, a terminal Vdd of the semiconductor apparatus is connected to the positive side terminal of the capacitor C11, while a terminal Cell1 is connected to the negative terminal of the capacitor C11 and the positive side terminal of the serially connected capacitor C12. Similarly, terminals Cell2 to Cell5 are connected to respective terminals of the capacitors as shown in FIG. 1. The respective bypass use transistors TR11 to TR15 are assigned to the capacitors C11 to C15, respectively. The bases are connected to the transistor connection terminals OUT1 to OUT5, respectively.

Figure 6:
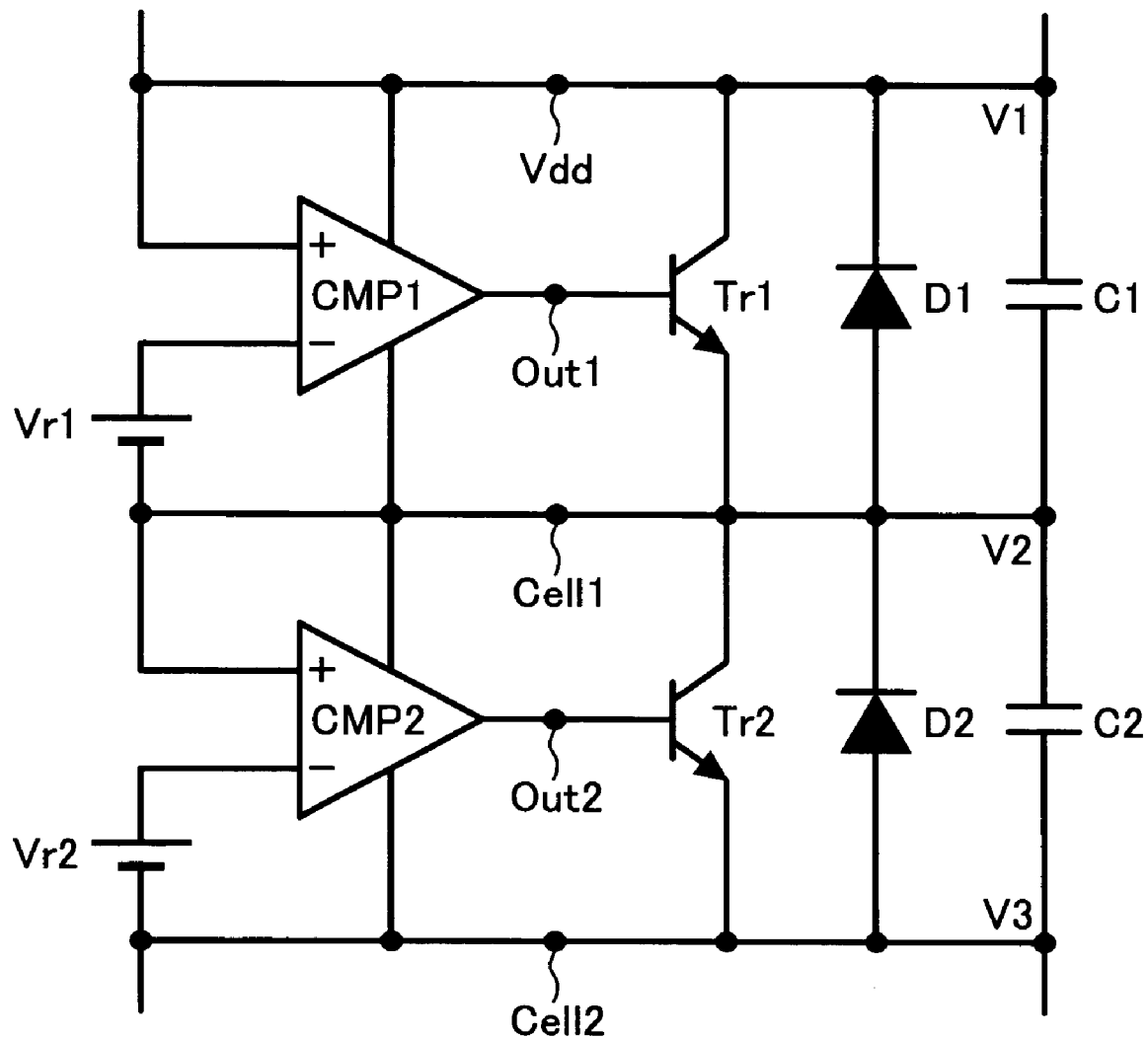
FIG. 6 illustrates an exemplary parallel monitor circuit and an exemplary connection terminal provided in a semiconductor apparatus according to one embodiment of the present invention.

Referring now to FIG. 6, an arrangement of connection terminals provided between a semiconductor apparatus and capacitors or bypass use transistors will be described in detail. As shown, only the capacitors 1 and 2 are illustrated. However, the capacitor 3 and subsequent capacitors have substantially the same configuration. The parallel monitor circuit includes a pair of comparators CMP1 and CMP2, non-inversion inputs of a power supply terminal Vdd and a voltage V2, and inversion inputs of voltages Vr1 and Vr2. When described linking with FIG. 1, the terminal Vdd of FIG. 1 corresponds to the power supply terminal Vdd of FIG. 6. The Out1 of FIG. 1 is connected to an output of the comparator CMP1 and a base of the bypass use transistor Tr1 in FIG. 6. The Cell1 terminal of FIG. 1 serves as a negative side terminal of the capacitor 1 in FIG. 6. The Out2 terminal of FIG. 1 is connected to an output of the comparator CMP2 and a base of the bypass use transistor Tr2 in FIG. 6. The Cell2 terminal of FIG. 1 serves as a negative side terminal of the capacitor 2 in FIG. 6. Similarly, respective terminals of the Out3 to Out 5 and Cell3 to Cell5 of FIG. 1 are connected to those of the corresponding capacitors 3, 4, and 5 and bypass use transistors Tr3, Tr4, and Tr5, respectively, in FIG. 6.

Figure 2:
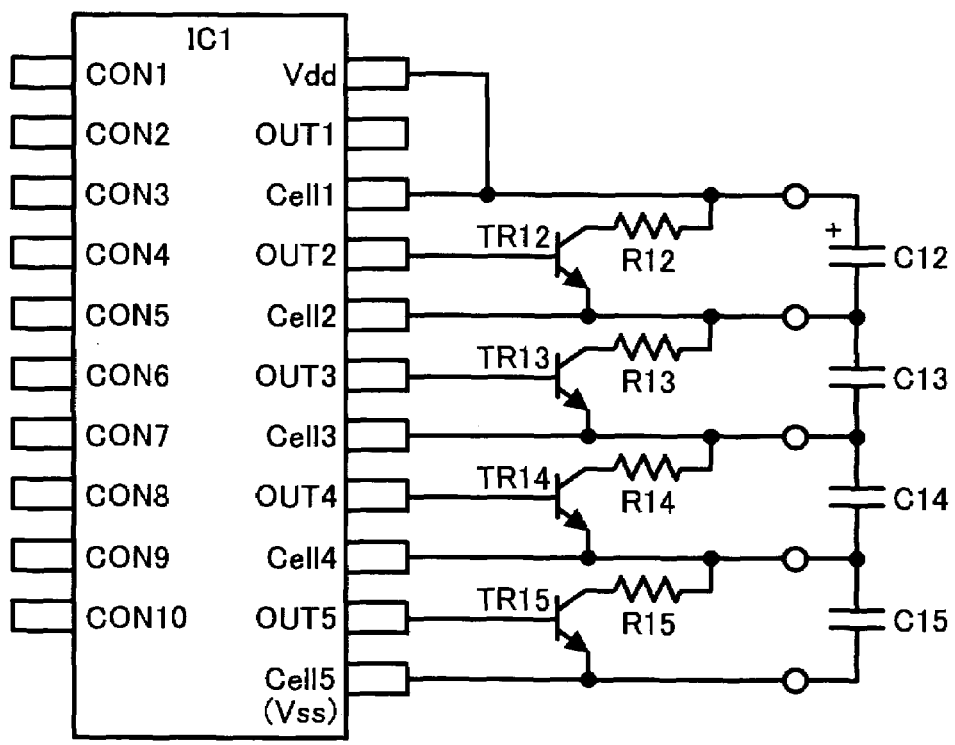
FIG. 2 illustrates an exemplary capacitor charging semiconductor apparatus according to a second embodiment of the present invention.

A capacitor charging semiconductor apparatus according to a first embodiment of the present invention will now be described with reference to FIG. 2. As shown, four capacitors are charged. A difference from the semiconductor apparatus of FIG. 1 is that the terminals Vdd and Cell1 are shorted, and a positive side terminal of a capacitor C12 disposed at the highest voltage side among the four capacitors is connected to a capacitor connection terminal Cell1 of a semiconductor apparatus. Thus, when a smaller number of capacitors is to be charged, a prescribed number of capacitor connection terminals neighboring the high voltage side capacitor connection terminal Vdd are preferably shorted as a number of capacitors decrease. For example, when three capacitors are to be charged, three terminals Vdd, Cell1, and Cell2 are preferably shorted, and a positive side terminal of a capacitor of the highest voltage is preferably connected to the terminal Cell2. Thus, one to five capacitors are optionally charged.

Figure 3:
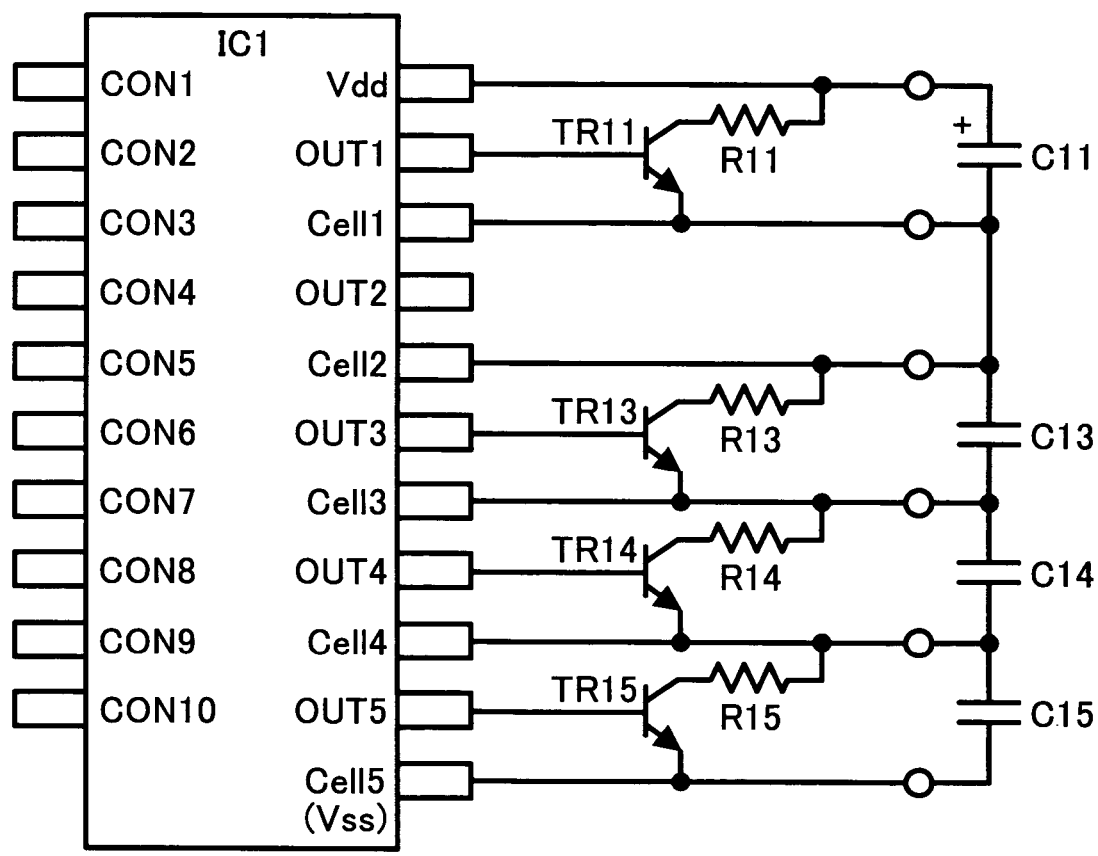
FIG. 3 illustrates an exemplary capacitor charging semiconductor apparatus according to a third embodiment of the present invention.

A capacitor charging semiconductor apparatus according to a second embodiment of the present invention will now be described with reference to FIG. 3. As shown, four capacitances are charged as in the first embodiment. The only difference from the semiconductor apparatus of FIG. 2 is that capacitor connection terminals Cell1 and Cell2 are shorted. Although there is a restriction in the first embodiment of FIG. 2 that a capacitor connection terminal should be shorted in order from the highest voltage side capacitor connection terminal Vdd, such a restriction is not needed, and even a restriction of wiring and so on is decreased in the second embodiment of FIG. 3 because capacitor connection terminals are optionally shorted. For example, when three capacitors are to be charged, any two of the capacitor connection terminals are optionally shorted. Thus, one to five capacitors can be optionally charged.

Figure 4:
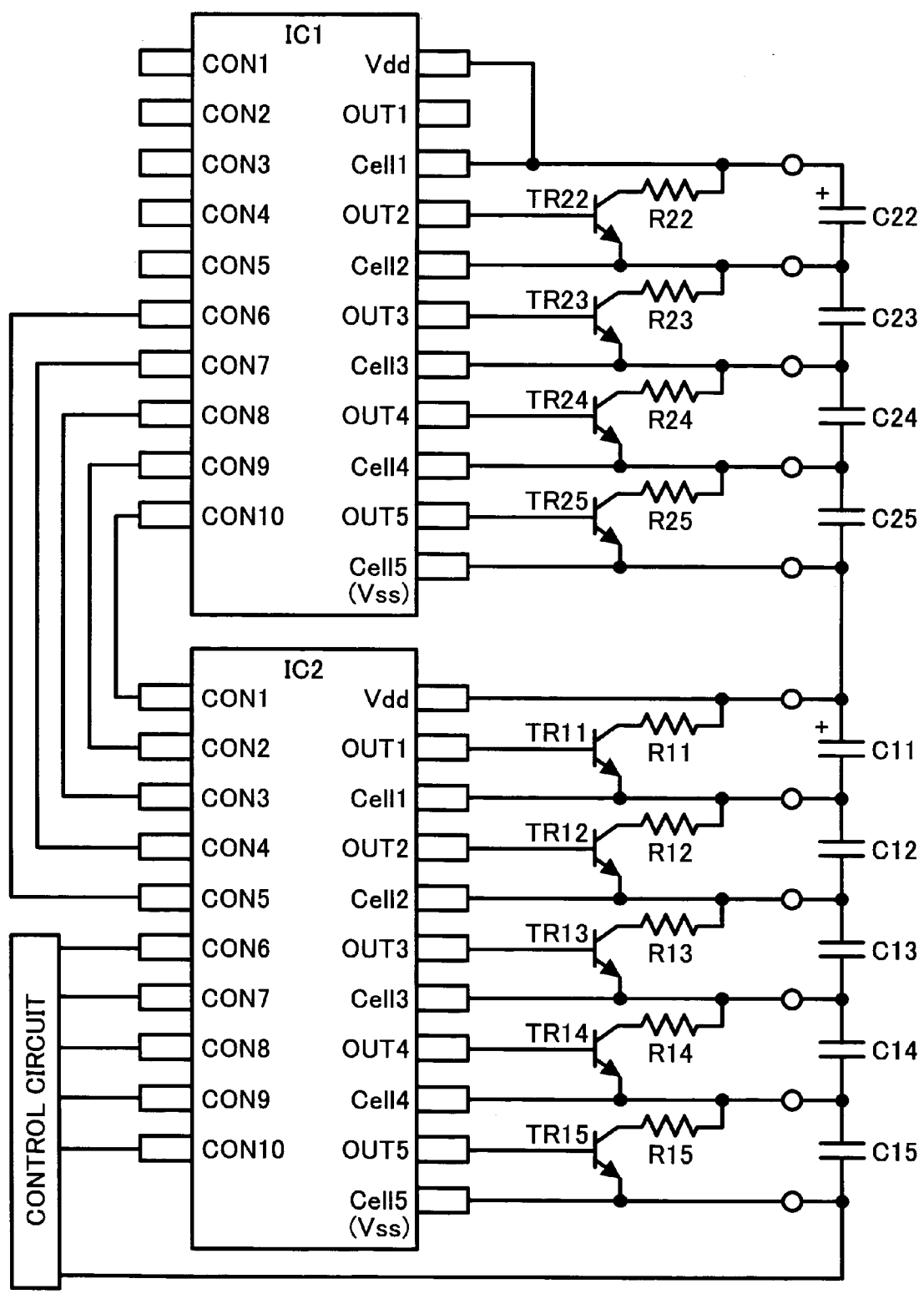
FIG. 4 illustrates exemplary capacitor charging semiconductor apparatuses longitudinally connected to each other according to a fourth embodiment of the present invention.

A capacitor charging semiconductor apparatus according to a third embodiment of the present invention will now be described with reference to FIG. 4. As shown, two units of semiconductor apparatuses are longitudinally connected. If the semiconductor apparatus of FIG. 2 is employed, and a number of capacitor connection terminals are increasingly shorted from the highest voltage side capacitor connection terminal Vdd as shown in FIG. 4, six to ten capacitors can be charged. Further, if the semiconductor apparatus of FIG. 3 is employed (not shown) and a number of optional capacitor connection terminals in the semiconductor apparatuses IC1 and IC2 of FIG. 4 are increasingly shorted, one to ten capacitors can be charged. A control circuit is connected to the semiconductor apparatus IC2 is formed from a CPU or the like to control a charge current supplied to the capacitors C11 to C15 and C22 to C25 as well as the semiconductor apparatuses IC1 and IC2.

Figure 5:
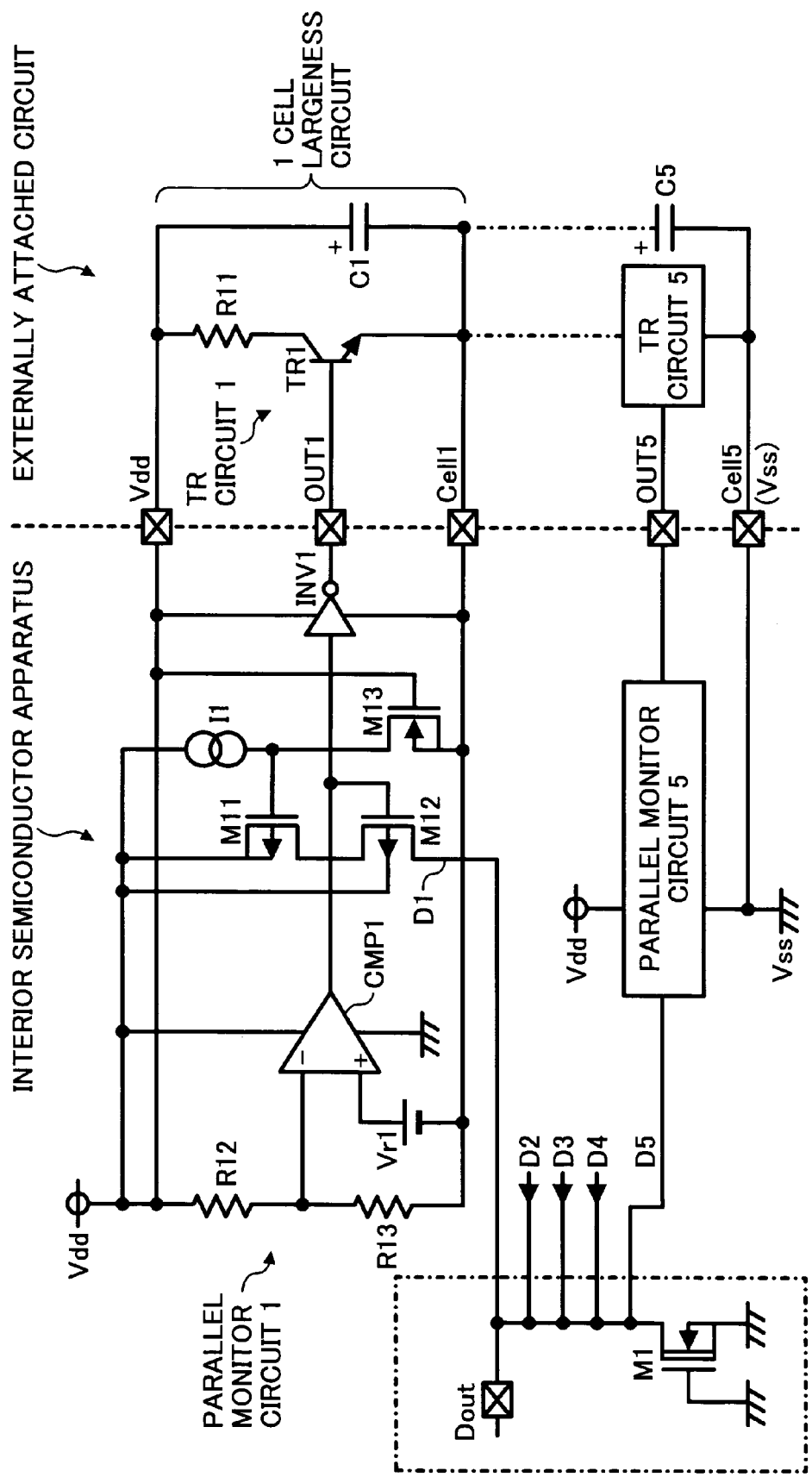
FIG. 5 illustrates an exemplary semiconductor apparatus according to a fourth embodiment of the present invention.

A parallel monitor circuit according to a fourth embodiment of the present invention will be described with reference to FIG. 5. A parallel monitor circuit 1 controls charging to the highest voltage side capacitor in a semiconductor apparatus. Five circuits of substantially the same configuration are included in the semiconductor apparatus in this embodiment. Specifically, parallel monitor circuits 1 to 5 are arranged in order from the highest voltage side. Since these parallel monitor circuits 1 to 5 have substantially the same configuration, only the parallel monitor circuit 1 is typically described. The parallel monitor circuit 1 includes a pair of resistances R12 and R13 which detect a voltage of a capacitor C1, a reference voltage Vr1, a comparator CMP1, an inverter INV1, and three MOSFETS M11, M12, and M13. A power supply for the comparator CMP1 has the same voltage as that of the semiconductor apparatus. A voltage obtained by dividing the voltage of the capacitor C1 is connected to an inversion input terminal (−) of the comparator CMP1, while a reference voltage Vr1 is connected to a non-inversion input terminal (+). An output of the comparator CMP1 is connected to an input of an inverter INV1.

Since the same voltage as that applied to the capacitor C1 is applied to an inverter INV1 as a power supply, an output voltage of the inverter INV1 ranges within the voltage of the capacitor C1. Thus, a signal is outputted limiting the output voltage of the comparator CMP1. The output of the inverter INV1 is connected to a transistor connection terminal OUT1 and a base of a bypass use transistor Tr1. When a voltage of the capacitor C1 is low and that of the inversion input terminal (−) of the comparator CMP1 is lower than a reference voltage Vr1, an output of the comparator CMP1 is high (i.e., Vdd). The signal is inverted by the inverter INV1 with voltage limitation within the voltage range of the capacitor C1. A low level signal outputted from the inverter INV1 is a negative side potential of the capacitor C1. Since this voltage is outputted from the transistor connection terminal OUT1, a voltage between the base and emitter of the bypass use transistor TR1 is zero volts. Thus, the bypass use transistor TR1 is turned off and does not bypass charge current.

When the voltage of the capacitor increases and that of the inversion input terminal (−) of the comparator CMP1 exceeds the reference voltage Vr1, an output of the comparator CMP1 becomes low (i.e., Vss). The inverter INV1 inverts this signal, and the voltage is limited within that of the capacitor C1. A high level signal outputted from the inverter INV1 is a potential of the positive side of the capacitor C1. Since this voltage is outputted from the transistor connection terminal OUT1, a base current is supplied to the bypass use transistor TR1. Thus, the bypass use transistor TR1 is turned on, and bypasses charge current.

The MOSFETs M1 and M11 to M13 collectively form a circuit for generating a charge completion signal that externally informs completion of charging to the capacitor C1. The source of the NchMOSFET M13 is connected to a negative side potential of the capacitor C1, while the gate is connected to a positive side potential of the capacitor C1. Further, the drain is connected to a power supply Vdd of the semiconductor apparatus via a current source 11 serving as a load and the gate of the PchMOSFET M11.

The source of the PchMOSFET M11 is connected to the power supply Vdd of the semiconductor apparatus, while its drain is connected to the source of the PchMOSFET M12. The gate of the PchMOSFET M12 is connected to an output of the comparator CMP1. Further, the drain of the PchMOSFET M12 is connected to a drain of a depletion type NchMOSFET M1 arranged in a control circuit. Since the source and gate of the depletion type NchMOSFET M1 are shorted to each other, the depletion type NchMOSFET M1 constitutes a constant current source and operates as a load for the PchMOSFETs M11 and M12.

Since an output voltage of the comparator CMP1 becomes low (i.e., Vss) when the voltage of the capacitor C1 increases and that of the inversion input terminal (−) of the comparator CMP1 exceeds the reference voltage Vr1, the gate voltage of the PchMOSFET M12 decreases and turns on the PchMOSFET M12. Simultaneously, since the gate voltage of the NchMOSFET M13 is the same as that of the capacitor C1, and thus the NchMOSFET M13 is turned on, the gate voltage of the PchMOSFET M11 decreases and turns on the PchMOSFET M11.

Specifically, since the PchMOSFETs M11 and M12 are turned on when charging to the capacitor C1 is completed, the drain voltage of the PchMOSFET M12 becomes equivalent to the power supply voltage Vdd. Such a voltage serves as a charge completion signal D1 of the parallel monitor circuit 1. The same circuits are provided in respective parallel monitor circuits 2 to 5, and respective charge completion signals D2 to D5 outputted from the respective circuits are connected to the drain of the depletion type NchMOSFET M1.

When at least one of charge completion signals D1 to D5 is outputted, the terminal Dout becomes high (i.e., Vdd), the one of charge completion signals D1 to D5 becomes a charge completion signal that externally informs completion of charging to the one of the capacitors C1 to C5. If the capacitor connection terminals Vdd and Cell1 are shorted, the gate and source of the NchMOSFET M13 are shorted to each other resulting in turning off the NchMOSFET M13.

Since the drain of the NchMOSFET M13 (i.e., the gate of the PchMOSFET M11) becomes high (i.e., Vdd) as a result, and thus the PchMOSFET M11 is turned off, a charge completion signal D1 is not outputted. Specifically, when the capacitor connection terminal is shorted, a charge completion signal is not erroneously generated from a parallel monitor circuit. Even though the above-mentioned preferred embodiment uses the five chargeable capacitors for one semiconductor apparatus, the present invention is not limited thereto and can optionally use a prescribed number of capacitors.

Figure 7:
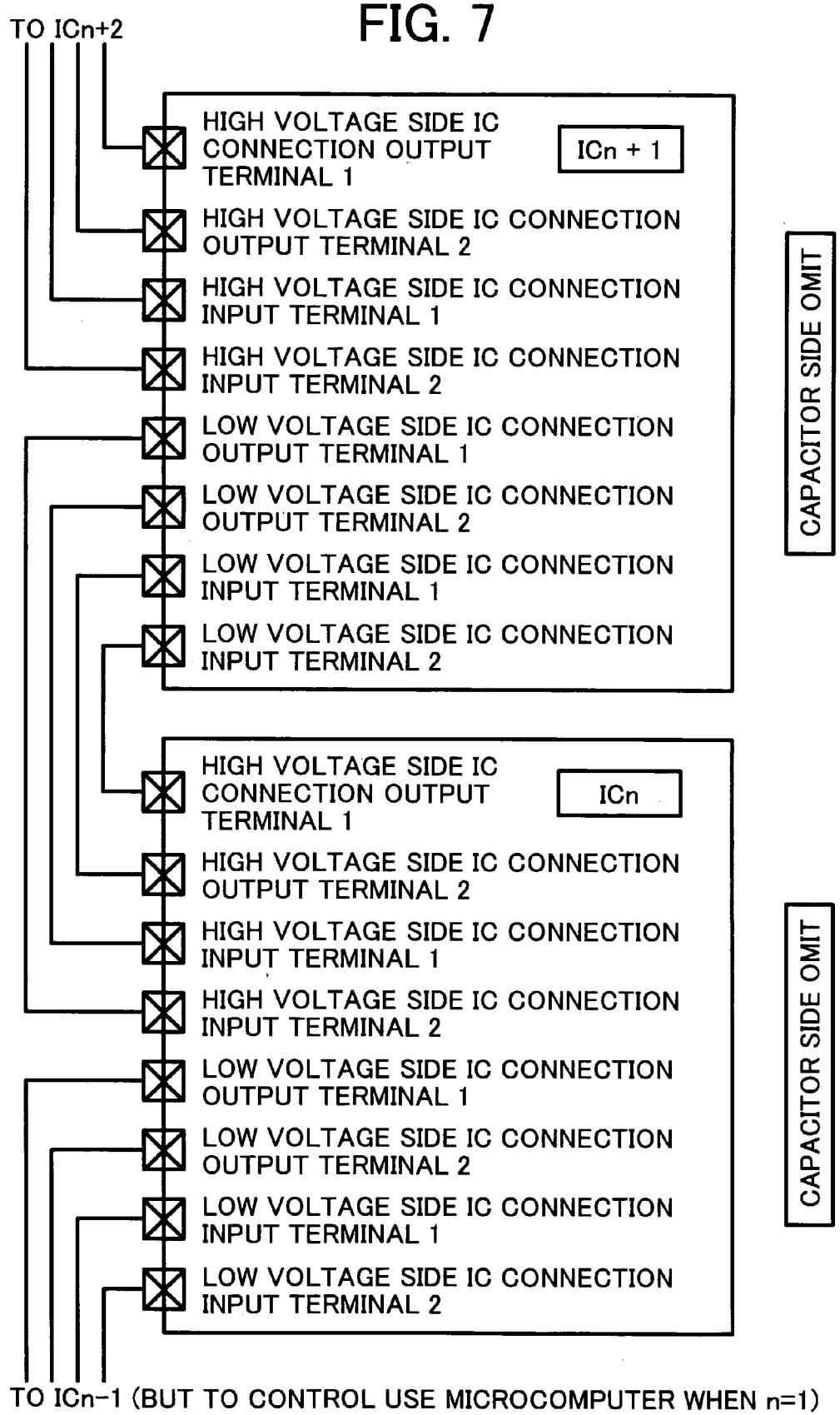
FIG. 7 illustrates an exemplary manner of connecting control terminals according to one embodiment of the present invention.

Four exemplary types of control terminals and a manner of connecting the control terminals will be now described with reference to FIGS. 7 and 8. As shown in FIG. 7, the control terminals CON1 to CON10 of FIGS. 1 to 4 are described. Specifically, an output terminal outputs a signal, which reports a condition of the semiconductor apparatus to a microcomputer, while an input terminal receives an input of a control signal, which controls a semiconductor apparatus, from a microcomputer. For example, output and input signals are transmitted as a pair to a semiconductor apparatus (IC). As shown, four types of control terminals are connected between semiconductor apparatuses ICn+1 and ICn. However, a number of control terminals per an IC is not limited thereto. Further, up and down signals are connected to terminals as shown in FIGS. 8A and 8B. However, a number of up and down signals is not limited thereto.

A microcomputer is connected to an IC, which is connected to the lowest voltage (i.e., zero volts) through its Vss terminal. An IC of the lowest voltage side is given a reference numeral IC1, an IC next to the IC1 is given a reference numeral IC2, and the n-th number IC is given a reference numeral ICn. When the microcomputer is connected, a detection signal, such as a voltage detection alarm, a negative voltage detection alarm, etc., which appears in a serially connected capacitor system, is required to be outputted from an applicable IC to the microcomputer. Thus, the alarm signal is transmitted from the ICn to the microcomputer via the IC1. A control terminal is provided on the high voltage side of the ICn to be connected to the ICn+1, while a control terminal is provided on the low voltage side thereof to be connected to the ICn−1.

Since the alarm signal needed to be transmitted to the semiconductor apparatus ICn−1 is outputted from the low voltage side IC connection terminal of the semiconductor apparatus ICn, and inputted to the high voltage side IC connection terminal of the semiconductor apparatus ICn−1. A signal transmitted to a low voltage side IC is hereinafter referred to as a down signal, while a signal transmitted to a high voltage side IC is hereinafter referred to as an up signal. The down signal inputted to the ICn−1 undergoes signal conversion in an interior circuit, and outputted from the low voltage side IC connection terminal of the ICn−1. The down signal is then inputted to the high voltage side IC connection terminal of the ICn−2. By repeating signal transmissions in such a manner, the down signal is finally inputted to the high voltage side IC connection terminal of the IC1. The down signal inputted to the IC1 undergoes signal conversion in the interior circuit, and is outputted from the low voltage side IC connection terminal to the microcomputer. The alarm signal is transmitted in such an order.

Further, a control signal transmitted from the microcomputer is the up signal, and is inputted to the low voltage side IC connection terminal of the IC1. The up signal in the IC1 then receives signal conversion in the interior circuit and is outputted therefrom and inputted to the low voltage side IC connection terminal of the IC2. By repeating the above-mentioned operations, the control signal is finally transmitted to the highest voltage IC. In summary, a low voltage side IC connection terminal outputs a down signal therefrom and inputs it to a corresponding high voltage side IC connection terminal of another low voltage side IC lower by one. A high voltage side IC connection terminal outputs an up signal therefrom and inputs it to a corresponding low voltage side IC connection terminal of another high voltage side IC higher by one. As shown in FIG. 7, four types of control terminals, i.e., high voltage side IC connection input and output terminals, and low voltage side IC connection input and output terminals, are employed.

Figure 8A:
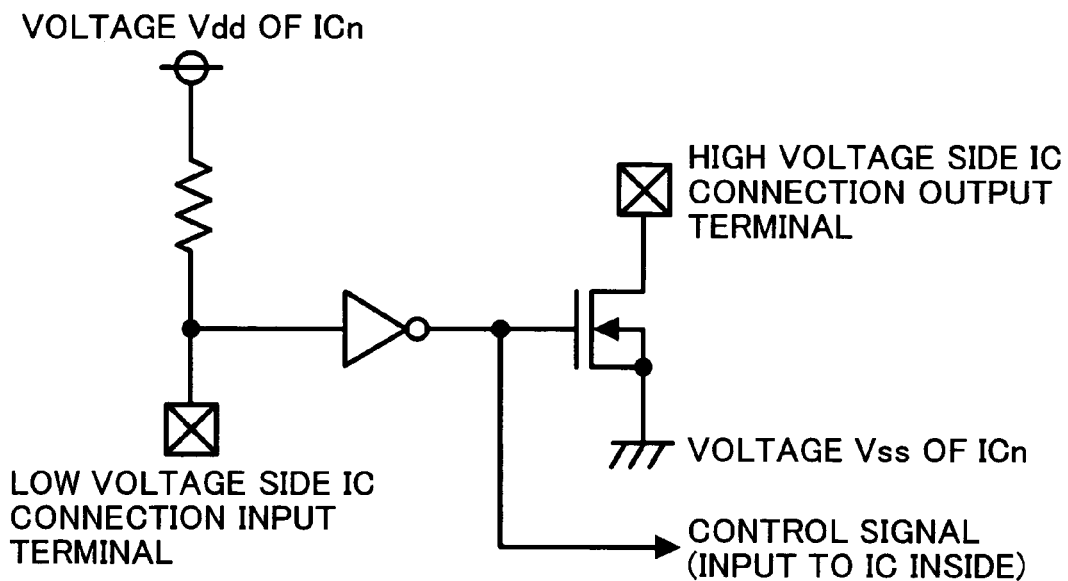
FIGS. 8A and 8B specifically illustrate the exemplary connecting manner according to one embodiment of the present invention.
Figure 8B:
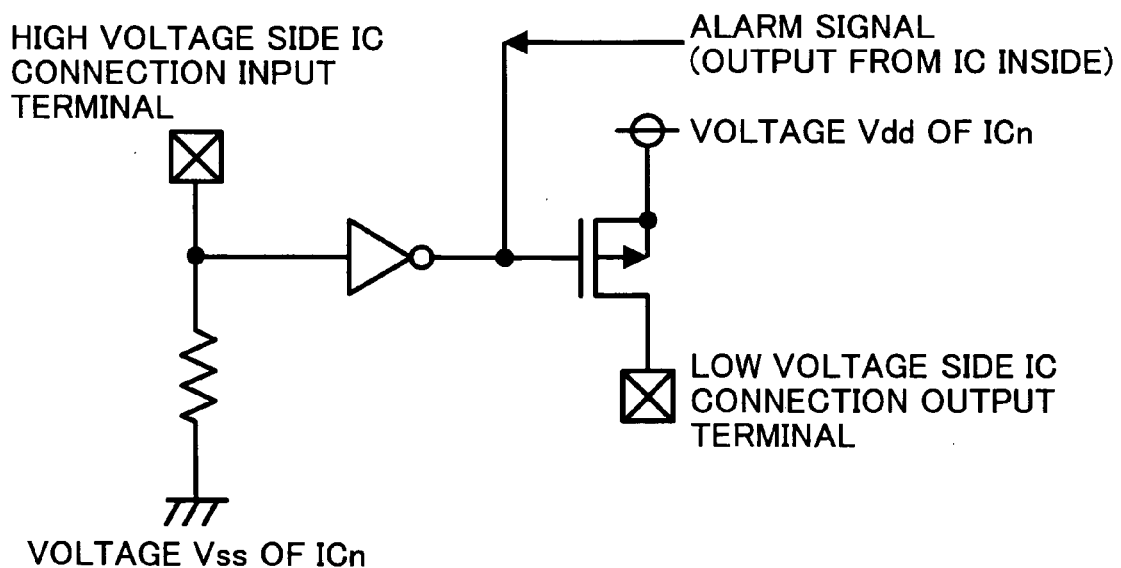

As shown in FIGS. 8A and 8B, the high voltage side IC connection output terminal can be an N-channel open drain, for example. The high voltage side IC connection input terminal serves as an inverter input terminal in an opposite terminal side of a high resistance element connected to the voltage Vss of the IC. The low voltage side IC connection output terminal can be a P-channel open drain. The low voltage side IC connection input terminal serves as an inverter input terminal on an opposite terminal side of a high resistance element that is connected to the voltage Vdd of the IC. When the N-channel open drain of the high voltage side IC connection output terminal of the semiconductor apparatus ICn is turned on, the voltage of the high voltage side IC connection output terminal of the semiconductor apparatus ICn becomes equivalent to the voltage Vss of the semiconductor apparatus ICn. The low voltage side IC connection input terminal of the semiconductor apparatus ICn+1 receives a LOW signal as a corresponding recipient from the semiconductor apparatus ICn. Then, some current flows to the high resistance element connected to the Vdd of the semiconductor apparatus Icn+1, while a LOW signal is inputted to the inverter input. A signal is transmitted through the semiconductor apparatus ICn+1, and turns on the N-channel open drain of the high voltage side IC connection output terminal of the semiconductor apparatus ICn+1. Thus, the signal is transmitted to the semiconductor apparatus ICn+2.

When the N-channel open drain of the high voltage side IC connection output terminal of the semiconductor apparatus ICn is turned off, the high voltage side IC connection output terminal of the semiconductor apparatus ICn is in a floating state. However, since being drawn by the high resistance element connected to the Vdd, which is connected to the low voltage side IC connection input terminal of the semiconductor apparatus ICn+1, the voltage of the high voltage side IC connection output terminal serving as a corresponding recipient becomes equivalent to the voltage Vdd of the semiconductor apparatus ICn+1.Thus, a high level signal is inputted to the inverter input of the low voltage side IC connection input terminal of the semiconductor apparatus ICn+1. The high level signal is conveyed through the semiconductor apparatus ICn+1, and turns off the N-channel open drain of the high voltage side IC connection output terminal of the semiconductor apparatus ICn+1. Then, the signal is transmitted to the semiconductor apparatus ICn+2.

When the P-channel open drain of the low voltage side IC connection output terminal of the semiconductor apparatus ICn is turned on, the voltage of the low voltage side IC connection output terminal of the semiconductor apparatus ICn becomes equivalent to the voltage Vdd of the semiconductor apparatus ICn. The high voltage side IC connection input terminal of the semiconductor apparatus ICn−1 receives a high level signal of the semiconductor apparatus Icn as a corresponding recipient. Thus, some current flows through the high resistance element connected to the voltage Vss of the semiconductor apparatus ICn−1, while a high level signal is inputted to the inverter. The signal is conveyed through the semiconductor apparatus ICn−1, and then turns on the P-channel open drain of the low voltage side IC connection output terminal of the semiconductor apparatus ICn−1. Thus, the signal is transmitted to the semiconductor apparatus ICn−2.

When the P-channel open drain of the low voltage side IC connection output terminal of the semiconductor apparatus ICn is turned off, the low voltage side IC connection output terminal of the semiconductor apparatus ICn is in a floating state. However, since being drawn by the high resistance element connected to the Vss, which is connected to the high voltage side IC connection input terminal of the ICn−1 serving as a corresponding recipient, the voltage of the low voltage side IC connection input terminal becomes equivalent to the voltage Vss of the ICn−1. Thus, a low-level signal is inputted to the inverter input of the high voltage side IC connection input terminal of the semiconductor apparatus ICn−1. The low-level signal is conveyed through the semiconductor apparatus ICn−1, and then turns off the P-channel open drain of the low voltage side IC connection output terminal of the semiconductor apparatus ICn−1. Thus, the low level signal is transmitted to the semiconductor apparatus ICn−2. A system using the above-mentioned control terminal is not limited thereto, and the other system can be employed.

Further, a type of a terminal employable in the present invention can be either a pin insertion type or a surface package type. The surface package type can include ball grid, Gull-wing lead, and J-lead type terminals. Various packages, such as a DIP, a PGA, a SOP, a QFP, a BGA, a CSP, etc., having an opposing lead side can be employed.

The invention claimed is:

1. A capacitor charging semiconductor apparatus, comprising:
   at least two capacitors connected to each other;
   a power source configured to supply charge current to the at least two capacitors;
   at least two bypass transistors each configured to bypass the charge current when a voltage of an applicable capacitor exceeds a prescribed reference level;

at least two monitor circuits configured to control the at least two bypass transistors to equally charge the at least two capacitors;

at least three capacitor connection terminals connected to both ends and at least one intersection between the at least two capacitors; and at least two transistor connection terminals connected to control terminals of the at least two bypass transistors, wherein a prescribed number of the capacitors are optionally charged by increasingly shorting a number of capacitor connection terminals by means other than said bypass transistors.

2. The capacitor charging semiconductor apparatus of claim 1, wherein said number of capacitor connection terminals are increasingly shorted in order from a highest voltage side capacitor connection terminal.

3. A capacitor charging semiconductor apparatus, comprising:

at least two capacitors connected to each other;

a power source configured to supply charge current to the at least two capacitors;

at least two bypass transistors each configured to bypass the charge current when a voltage of an applicable capacitor exceeds a prescribed reference level;

at least three monitor circuits configured to control the at least two bypass transistors to equally charge the at least two capacitors;

at least two capacitor connection terminals connected to both ends and at least two intersections between the at least two capacitors; and at least two transistor connection terminals connected to control terminals of the at least two bypass transistors, wherein a prescribed number of capacitors are charged by shorting neighboring capacitor connection terminals by means other than said bypass transistors.

4. The capacitor charging semiconductor apparatus as claimed in any one of claims 1 and 3, wherein each of the at least two capacitor charging semiconductor apparatuses includes at least two control terminals; and said at least two capacitor charging semiconductor apparatuses are longitudinally connected to each other via the at least two control terminals.

5. The capacitor charging semiconductor apparatus according to claim 4, wherein each of the at least two monitor circuits includes a signal generation device configured to generate a signal indicative of completion of charging to an applicable capacitor when a voltage of the applicable capacitor reaches a prescribed reference level, and wherein the signal is not outputted from a monitor circuit where an applicable capacitor connection terminal is shorted.

6. A capacitor charging semiconductor apparatus, comprising:

at least two capacitors connected to each other;

a power source configured to supply charge current to the at least two capacitors;

at least two bypass transistors each configured to bypass the charge current when a voltage of an applicable capacitor exceeds a prescribed reference level;

at least two monitor circuits configured to control the at least two bypass transistors to equally charge the at least two capacitors;

at least three capacitor connection terminals connected to both ends and at least one intersection between the at least two capacitors; and at least two transistor connection terminals connected to control terminals of the at least two bypass transistors, wherein a prescribed number of the capacitors are optionally charged by increasingly shorting a number of capacitor connection terminals, wherein each of the at least two monitor circuit includes a signal generation device configured to generate a signal indicative of completion of charging to an applicable capacitor when a voltage of the applicable capacitor reaches a prescribed reference level, and wherein the signal is not outputted from a parallel monitor circuit where an applicable capacitor connection terminal is shorted.

7. A capacitor charging semiconductor apparatus, comprising:

at least two capacitors connected to each other;

a power source configured to supply charge current to the at least two capacitors;

at least two bypass transistors each configured to bypass the charge current when a voltage of an applicable capacitor exceeds a prescribed reference level;

at least three monitor circuits configured to control the at least two bypass transistors to equally charge the at least two capacitors;

at least two capacitor connection terminals connected to both ends and at least two intersections between the at least two capacitors; and at least two transistor connection terminals connected to control terminals of the at least two bypass transistors, wherein a prescribed number of capacitors are charged by shorting neighboring capacitor connection terminals, wherein each of the at least two monitor circuit includes a signal generation device configured to generate a signal indicative of completion of charging to an applicable capacitor when a voltage of the applicable capacitor reaches a prescribed reference level, and wherein the signal is not outputted from a monitor circuit where an applicable capacitor connection terminal is shorted.

* * * * *